Jan. 6, 1942.  W. G. HARDING ET AL  2,269,103
GYROSCOPIC INSTRUMENT
Filed June 16, 1938  6 Sheets-Sheet 1

INVENTORS
WILLIAM G. HARDING
ROBERT H. NISBET
BY
Herbert H. Thompson
THEIR ATTORNEY

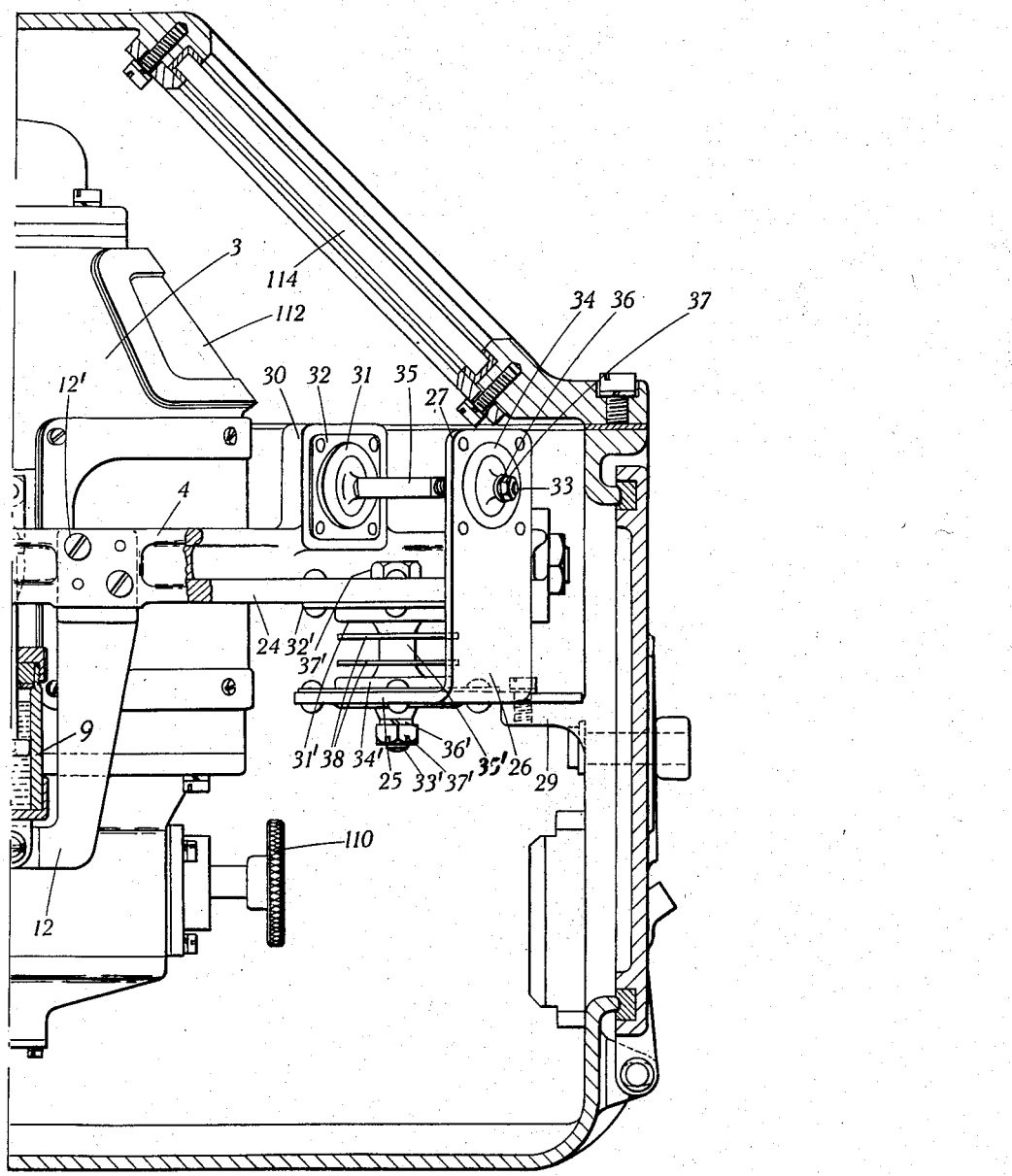

Jan. 6, 1942.    W. G. HARDING ET AL    2,269,103
GYROSCOPIC INSTRUMENT
Filed June 16, 1938    6 Sheets-Sheet 4

INVENTORS
WILLIAM G. HARDING
ROBERT H. NISBET
BY
Herbert H. Thompson
THEIR ATTORNEY

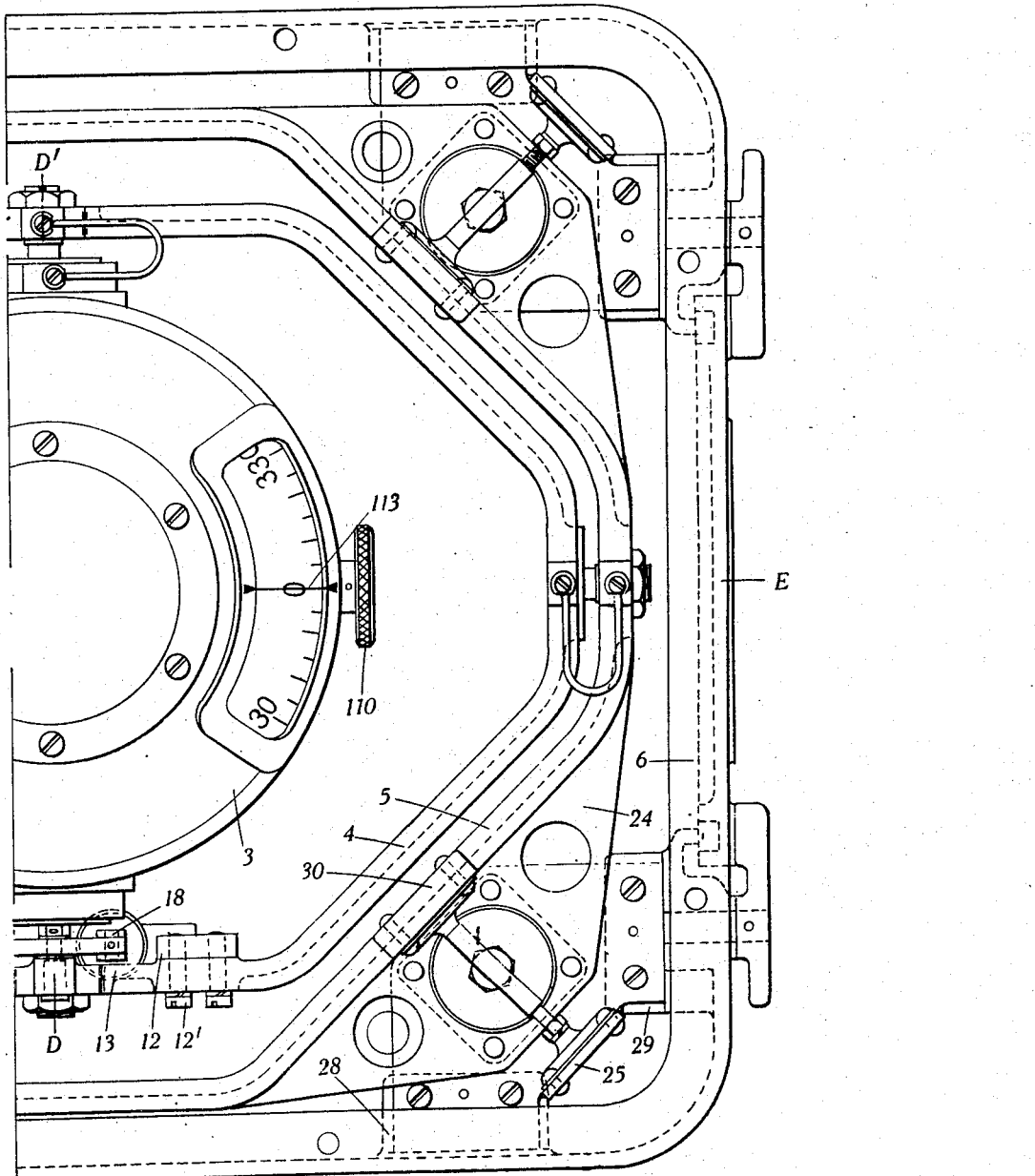

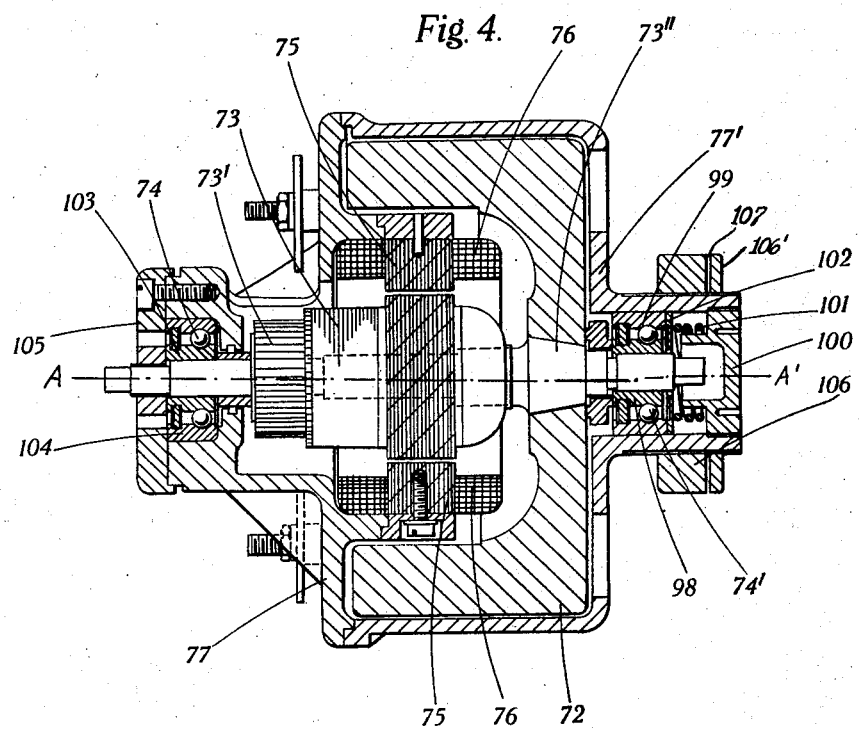

Patented Jan. 6, 1942

2,269,103

UNITED STATES PATENT OFFICE 2,269,103

GYROSCOPIC INSTRUMENT

William George Harding, Whitton, and Robert Hayes Nisbet, Osterley, England, assignors to Sperry Gyroscope Company, Inc., Brooklyn, N. Y., a company of New York Application June 16, 1938, Serial No. 213,988
In Great Britain June 17, 1937

2 Claims. (Cl. 308—184)

This invention is concerned with improvements in gyroscopic apparatus generally, but particularly in gyroscopic instruments for use in land vehicles such as tanks. In tanks magnetic compasses are unsteady and quite erroneous, while gyroscopic compasses are impracticable, so that reliance must be made on a directional, or azimuth, gyro as the direction giving instrument. A directional gyro for use in tanks should therefore remain constant in direction or drift only very slowly for long periods of time. However, if directional gyros for tanks are employed of the same basic design as those used in aircraft they are found to be less accurate than in aircraft, owing to the fact that certain conditions inimical to good performance are present to a much higher degree of magnitude in land vehicles than in aircraft as the latter are normally used.

It follows that the measures described below, although specifically devised to improve the accuracy of instruments in land vehicles, can also be applied with advantage to aircraft instruments.

Directional gyros and gyroscopic meridian-seeking compasses are characterised by the use of a gyro with axis normally horizontal or approximately horizontal. The rotor shaft is carried in bearings in a bearing ring or rotor case, which is pivoted about a horizontal axis in a vertical cardan ring, itself turnable about a vertical axis in bearings in a main frame. In gyroscopic compasses this frame is usually pendulously mounted e. g. in gimbals, but in directional gyroscopes that are not meridian-seeking, previous practice has been to have the frame fixed to the craft.

We have found that considerable advantages are obtained by mounting the main frame of a directional gyro as a universal pendulum, e. g. by suspending it in gimbals. In land vehicles this is very necessary, as the vehicle may proceed for long stretches of time inclined either forward or laterally; the former occurring when the vehicle is climbing a hill, and the latter when it is on a cambered road or on the side of a hill.

When the vehicle is inclined, the normally vertical axis of the vertical ring is no longer truly vertical, and therefore part of the weight of the gyro and vertical ring is taken sideways by the radial bearings for the vertical axis, which otherwise act merely as guides. The frictional torques round the "vertical" axis, coming into existence during turning of the vehicle, therefore increase enormously in value, and, as this axis is not vertical, these torques have components about a horizontal axis, thus causing the axis of the gyro to precess from its original direction.

In addition to this effect, which in itself may be quite serious, inclination of the craft has other effects. One is that, if the vehicle is tilted through a large angle, in either or both the longitudinal and transverse planes, the gimbal axes may be very far from being perpendicular to the gyro axis, and the gyro is then at a large mechanical disadvantage in attempting to overcome frictional torques about the gimbal axes. The other effect comes into evidence in gyroscopic apparatus fitted with erection devices for keeping the axes perpendicular to each other. If the vehicle is tilted for some time, these devices cause the gyro axis gradually to tilt into line with the vehicle, whereupon, if the vehicle straightens out again, the gyro is left inclined for a time, so that it not only has a much reduced directional moment, but also is at a mechanical disadvantage in overcoming friction.

By hanging the main frame pendulously in gimbals from an outer supporting frame, we avoid all these troubles, but we find that the pendulous frame is apt to be swung about violently, thus causing the instrument to be damaged. We therefore provide means for damping any oscillation or swinging of the pendulous frame. For this purpose we use damping means, such as dash-pots, free from all centralising tendencies.

In order to prevent damage due to vertical shocks, the outer supporting frame is itself resiliently mounted in the binnacle. Preferably we mount the frame on a number of rubber mountings arranged in a plane, and provided with rubber damping cups.

The above measures by themselves will not achieve the necessary reliability for a gyro for use in tanks. It is desirable to use a larger gyro than is normally used for aircraft; also, to suit the power supplies available, it is convenient to spin the gyro electrically using direct current.

In order to lead the current from the main frame to the vertical ring, which members must be capable of relative rotation through any number of revolutions, we provide mercury cup connections at the top and bottom. A stub shaft extends out of the bottom of the vertical ring and passes through a radial ball bearing, for which it acts as the inner race, to rest on a single steel ball acting as a thrust bearing. This ball is completely submerged in a mercury cup, the mercury acting as the electrical connection from the cup to the shaft which is insulated from the vertical ring itself. This forms one electrical connection from the frame to the vertical ring. A similar arrangement is provided at the top of the vertical ring. A member insulated from the ring extends upwards through a radial bearing and at the top carries the compass card with a mercury cup at the centre. A cover over part of the compass card is fixed to the main frame and carries an insulated contact pin which extends downwards into the mercury cup. Another single ball, acting as a thrust bearing, lies at the bottom of the mercury cup, and the contact pin just clears this. This thrust bearing therefore is normally not in operation, but acts as a limit stop in case the whole sensitive element should be thrown upwards off its bottom thrust bearing by violent movements of the vehicle.

Even when all these steps were taken difficulties were found in obtaining a gyro whose axis would remain approximately constant for long periods. After a day or two the performance would deteriorate, and irregular wandering would develop. This trouble has been traced to an effect of even the very minute vibration of the rotor that persists after the rotor has been carefully balanced. This vibration causes the vertical ring and the whole frame to vibrate in unison with the rotor; the forces to make them do so having necessarily to be transmitted by the bearings supporting the rotor case in the cardan ring, and the cardan ring in the frame. The continuous high speed hammering of the ball races of these bearings by the balls rapidly creates minute indentations. Thereafter the bearings become sticky and jerky in their action, and frictional effects at these bearings disturb the gyro.

We have found that this state of affairs may be remedied quite simply. We mount at least one pair of bearings resiliently in its supporting frame. Preferably we provide such resilient supports only for the bearings for the axis of support of the rotor case. In the case of a directional gyro, we use the following embodiment of our invention:

The rotor case carries the two pivots for the tilt axis diametrically opposite each other in a line at right angles to the rotor axis. These pivots engage in two ball races which, however, are housed not directly in the vertical ring, but in blocks each in the form of a truncated cone surmounted by a cylinder, the axes of the blocks coinciding with the tilt axis of the rotor case. The conical surfaces of the blocks are covered with a thin layer or wrapping of resilient material, such as cork or oil-proof rubber, which forms a flanged conical sheath, and the whole conical plug so formed is located in a conical hole in the inside of the vertical ring. The cylindrical part of the block is screw-threaded, and protrudes through the vertical ring to the outside where a nut and washer are fitted on. By screwing up the nut the conical plug is pulled tightly into the conical hole. The sheath of resilient material separates the block from the vertical ring, and the nut and washer are separated from the ring by the flange on the resilient sheath, so that the whole assembly of rotor case and bearing blocks is resiliently mounted in the vertical ring without there being any metal to metal contact between the supporting and supported members. It is found that this structure will allow vibrations of the rotor to vibrate the bearing housing blocks without the vertical ring and frame being affected. The forces transmitted by the bearings are therefore very greatly reduced.

Although the resilient mounting satisfactorily filters out vibrations, it does not permit sufficient freedom to allow the rotor case to become displaced, either along the direction of tilt axis or along that of the rotor axis, so as to cause unbalances great enough to affect the performance of the gyro.

We find it necessary, however, to prevent the rotor becoming displaced along the rotor axis owing to end play in the rotor shaft bearings, which end play is apt to vary with temperature. Such displacements may change from one end to the other irregularly and cause irregular operation. We therefore spring load one of the bearings to urge this bearing towards the other, by this means keeping the rotor pressed in one direction.

In the accompanying drawings, which illustrate one embodiment of the invention,

Figures 2 and 2A are a sectional elevation, in two halves, of our complete instrument.

Figures 3 and 3A are a corresponding plan view, in two halves, of the complete instrument showing particularly the mounting of the frame in which the gyroscope itself is mounted.

Figure 4 is an axial sectional elevation of the gyro-rotor and its driving motor and their bearings.

Figure 1:
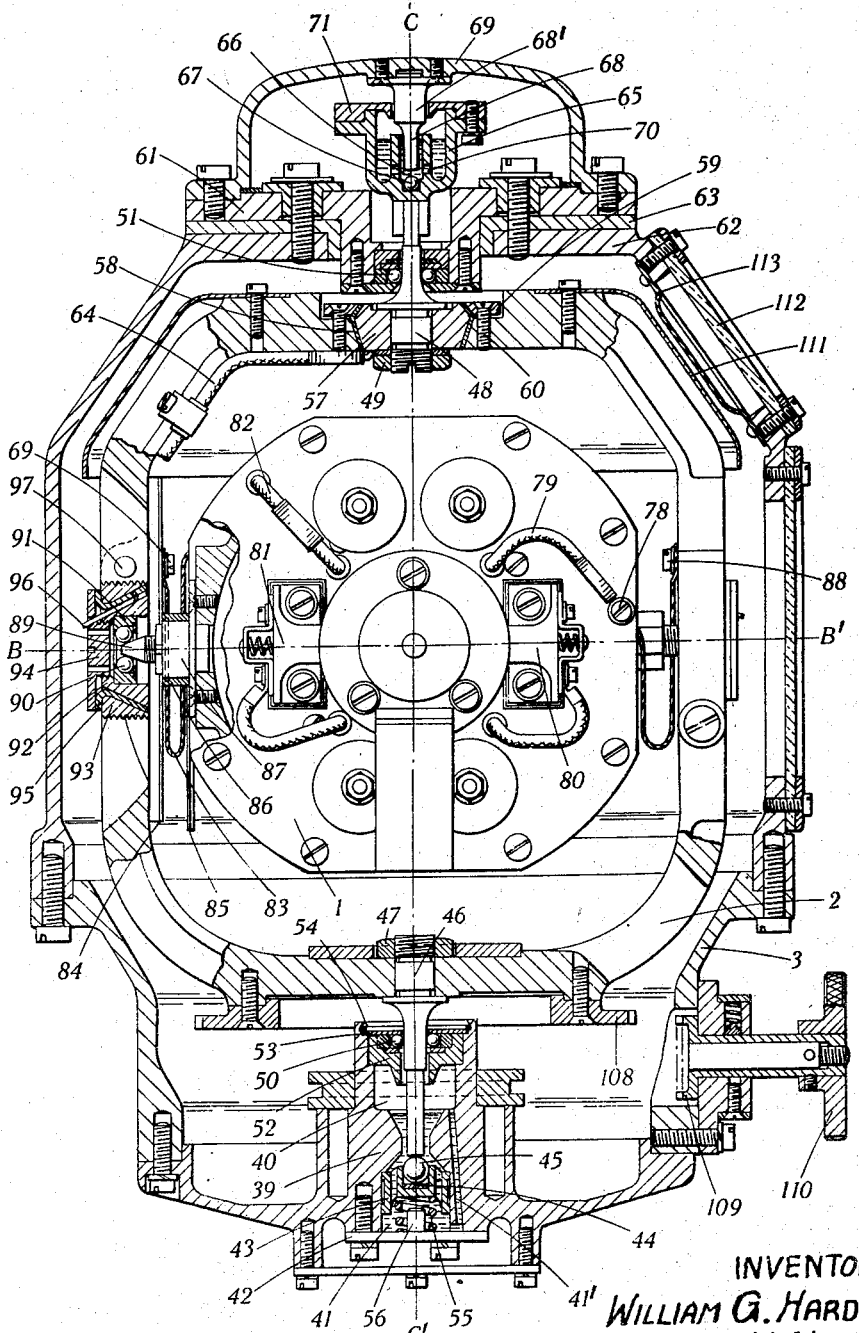
Figure 1 is a sectional elevation of a directional or azimuth gyroscope as viewed in the direction of the rotor axis.

In Fig. 1 there is shown a directional or azimuth, gyroscope comprising three principal members 1, 2, 3. The member 1 is the rotor case, within which the rotor spins about the normally horizontal axis AA'. The rotor case 1 is itself supported in the vertical ring 2 for oscillation about a normally horizontal axis BB' perpendicular to AA'. The vertical ring 2 is supported for turning in the main frame 3 about a normally vertical axis CC' perpendicular to BB'. Details of the bearings for the various axes are given hereinafter.

The gyro rotor has three degrees of rotational freedom (about each of the axes AA' BB' CC') with respect to the main frame 3,—which is all that is required for a free, or so-called directional gyro, so that further degrees of freedom are merely redundant. It has therefore been the practice heretofore to fix the main frame 3 of a directional gyroscope of the kind specified to the vehicle on which the instrument is mounted. In accordance with the principles of the present invention we do not do this, but suspend the outer frame 3 with freedom to tilt relatively to the vehicle.

Figure 2:
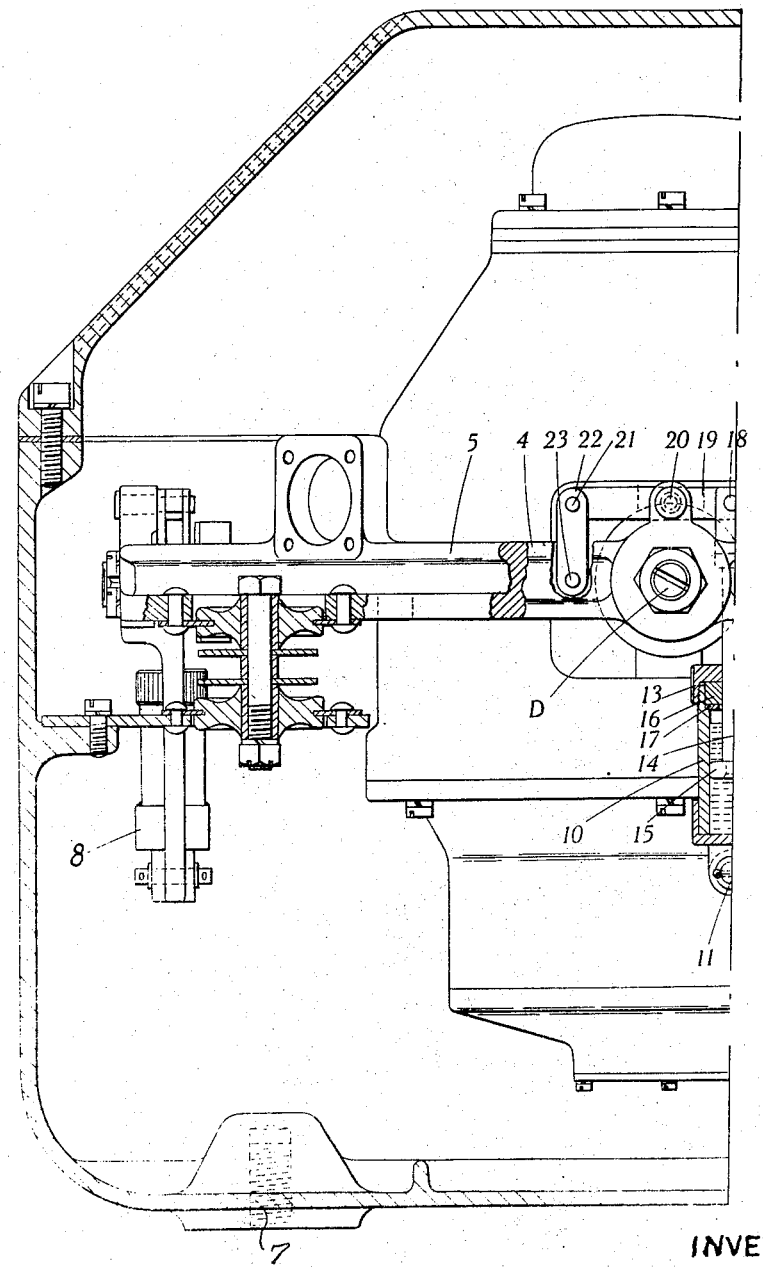
Figure 3:
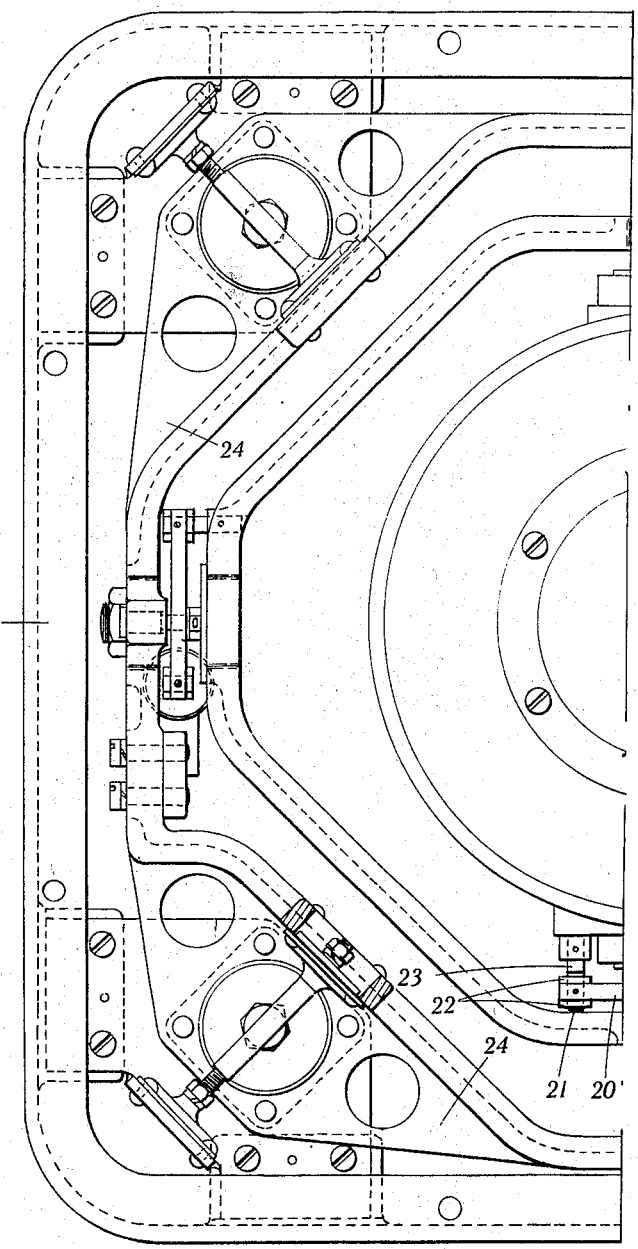

As shown in Figs. 2 and 3, the main frame 3 is formed as a casing of roughly cylindrical shape, which completely encloses the vertical ring and rotor case. It is mounted with freedom to tilt relatively to the gimbal ring 4 about the normally horizontal axis DD', while the gimbal ring 4 is itself mounted to tilt relatively to an outer or support ring 5 about the normally horizontal axis EE'. The outer or support ring is resiliently mounted in an outer casing, or binnacle, 6, which is securely fixed to the vehicle by bolts screwed into tapped holes 7 in the base. Thus the main frame 3 has two degrees of rotational freedom relative to the vehicle and in addition, it has three degrees of translational freedom conferred on it by the resilient mounting of the ring 5, details of which are given hereinafter.

The main frame 3 is made pendulous with respect to its axes of support DD' and EE', so that the axis CC' normally hangs vertical. The vehicle may then tilt in any direction, and remain so tilted for long periods, e. g. when it is cilmbing a hill or proceeding along the side of a hill or on a cambered road, but the axis CC' will not be disturbed thereby, and so will remain truly vertical and therefore perpendicular to the axes AA' and BB'.

When the vehicle is subjected to jolts or is accelerated, the main frame 3 is set swinging about the axes DD' and EE' by reason of its pendulousness. We provide means for preventing such oscillations building up to large amplitudes. These consist of a dashpot device 9, connected between the main frame 3 and the gimbal ring 4, which damps oscillations about the axis DD', and a similar device 8, connected between the rings 4 and 5 for damping oscillations about the axis EE'.

The dashpot 9 consists of a hollow cylinder pivoted at its lower end 11 to a bracket 12 secured to the inner gimbal ring 4 by screws 12'. The cylinder is filled with oil and is closed by a screw cap 13 through which passes the piston rod 14. To the end of the rod 14 is secured the piston 15 whose diameter of the piston is slightly smaller than the internal diameter of the cylinder 10. Packing 16 secured between the cap 13 and a washer 17 is provided round the rod 14 and cap 13.

The upper end of rod 14 is pivoted at 18 to the lever 19 which is itself free to oscillate about the pivot pin 20 fixed in the inner gimbal ring 4. In the other end of the lever 19 there is fixed a pin 21 acting as a pivot joint for linking the lever 19 to a link 22 pivoted on a pin 23 fixed in the main frame 3. The levers 19 and 22 are of such lengths as to form a parallelogram linkage i. e. the axis DD' and the axes of pins 20, 21 and 23 are situated at the vertices of a parallelogram.

If the main frame 3 tilts relatively to the inner gimbal ring 4, the lever 19 tilts about the pin 20 through the same angle, and causes the piston rod 14 to move in the cylinder 10, both the piston rod and the cylinder 10 oscillating on their pivots 18 and 11 during the process, so as to keep alignment with each other. Oil is able to escape only slowly past the piston in the cylinder, so that a coupling exists between the frame 3 and the ring 4, which opposes relative movements by viscous forces that rapidly damp out oscillations. It is to be remarked that viscous forces only are employed so that the vehicle can remain inclined for long periods without disturbing the average position of the main frame 3. In particular no elastic or other centralising constraints are employed.

The dashpot device 8 is similar in construction to device 9.

The resilient mountings for supporting the outer gimbal ring 5 in the binnacle 6 can also be seen in Figs. 2 and 3. The ring 5 is provided with flanges 24 opposite the four corners of the binnacle. Below each of these flanges is a platform 25 formed by the horizontal part of a bracket 26 which is bent to provide a vertical arm 27. The platform 25 is rigidly secured to lugs 28, 29 which are solid with the binnacle. The resilient mountings of the instrument are provided between the flanges 24 and the platforms 25 for yieldingly taking the weight of the instrument, and these are supplemented by others connected between the upright bracket arms 27 and corresponding flanges 30 on the outer ring 5 for yieldingly centralising the instrument in the binnacle.

One of these shock absorbers 31 is shown fixed to flange 30. It comprises a rubber bush fixed in a plate 32, which is secured to the flange 30: in the centre is fixed a ferrule through which passes the screwed rod 33. A similar rubber bush is shown at 34: this is secured to the arm 27 in the same manner as 31 is secured to flange 30. The two bushes 31 and 34—and therefore plate 30 and arm 27—are kept apart by the shouldered portion 35 at one end of rod 33 and a nut on the other end, and are kept from separating by washers 36 and nuts 37 screwed on each end of rod 33.

The mountings that take the weight of the instrument are of the same general type but are of more robust construction. One is shown in Fig. 2 carrying the same reference numerals (but primed) as are used for the above described centralising mounting. This mounting, however, embodies an additional feature—the discs 38 mounted on the rod 33' on each side of the sleeve 35'. These act as stops to prevent too large a movement of the instrument upwards or downwards relative to the binnacle during abnormally unsteady motion or bumps of the craft, since without such limit stops excessive strains might be obtained causing damage to the rubber mountings.

The rubber mountings give limited freedom of movement to the instrument in all directions and therefore yield to shocks in any direction and prevent damage to the instrument.

The gyroscope is of the electrically driven D. C. type, the current being obtained from a battery carried on the vehicle. Connections are taken by flexible cables from the binnacle to the main frame 3 and thence to the rotor case by means that we shall now describe.

As shown in Fig. 1, the lower part of the main frame 3 is provided at the centre with an upwardly extending cylindrical boss 39 through which a hole passes from top to bottom. This hole is narrowed in the middle so that it is divided into an upper chamber 40 and a lower chamber 41 intercommunicating by a narrow neck. A cover plate 42, constituting the bottom of the chamber 41, is screwed to the under side of the boss 39 so as to form a liquid-tight seal with it, and the chamber 40 is filled with mercury to a height reaching above the narrowest part of the neck and nearly to the bottom of the chamber 40. In this way the mercury is very little disturbed even if the whole instrument is thrown violently about.

The chamber 41 is finished internally to have a smooth accurately cylindrical bore which permits axial sliding movement of a closely fitting cylindrical plug 43. The plug is provided with a number of holes through it from top to bottom permitting the passage of liquid from above to below as the plug moves up and down in the chamber 41. The upper surface of the plug is provided with a cup-shaped hollow at the bottom of which is placed a hardened and polished steel disc 44. In the hollow and resting on the disc 44, there lies a single steel ball 45 of diameter slightly smaller than the cup: this ball acts as the thrust bearing supporting the vertical ring 2 in the frame 3.

The vertical ring is supported on the ball 45 by means of the long pivot stud 46, which is located in the lower part of the ring 2 and is secured there by the nut 47. A similar stud 48 and nut 49 is provided at the upper part of the ring 2. The two studs form the inner races for the radial or guide ball bearings 50, 51: they are accurately co-axial and together form the pivots for the ring 2.

The outer race of the bearing 50 is located in a plug 52, which is itself located in the upper part of the chamber, being secured therein by a cover plate 53 and spring ring 54. The plug 52 also acts as a roof for the chamber 40: it is extended downwards with only a very small clearance round the stud 46 so that mercury is prevented from being thrown up into the bearing 50.

The weight of the vertical ring 2 is applied to the cylindrical plug 43 through the thrust bearing 45 and plate 44. In order to reduce still further the effects of shocks on the vertical ring 2, the plug 43 is resiliently supported from the plate 42 by means of the spring 55: this normally holds the plug 43 pressed upwards to the limit of its range of movement, but, if the main frame 3 receives a violent upwards acceleration it will give slightly, thus softening the blow delivered to the vertical ring through the thrust bearing 45. A stud 56, which is solid with the bottom plate 42, locates the spring 55, and also acts as a limit stop for movement of the plug 43 in the chamber 41.

A vent hole 41' is provided connecting chambers 40 and 41: this is found to prevent high pressures being produced in the mercury in chamber 41 under special conditions which otherwise gives rise to splashing and leakage.

One of the legs of the D. C. electrical supply to the rotor of the gyroscope is connected to the main frame 3 and therefore via the mercury in chamber 41 and via stud 46 to the vertical ring 2. The other leg is in electrical circuit to the stud 48 by virtue of features that we shall now describe.

The stud 48 is not located in the vertical ring 2 itself, but in a bush 57 insulated from the vertical ring. As shown in Fig. 1, the bush 57 is conical and is located in a conical hole in the vertical ring 2, but is insulated from it by a sheath 58 of fibre or other insulating material. The bush 57 is tightly clamped into the conical hole in ring 2 by a clamping plate 59 which is also provided with a conical hole the surface of which conforms to a second conical surface on the upper side of the bush 57.

The fibre sheath 58 is extended between the bush 57 and the clamping plate 59 to insulate these from each other.

The plate 59 is screwed to the ring 2 by screws 60 by means of which pressure may be applied by plate 59 to the bush 57 to locate this rigidly in the vertical ring 2.

This part of the structure is assembled, impregnated, and baked, to form a rigid structure before machining takes place.

Just as the pivot stud 48 is insulated from the vertical ring 2, so is the bossed plate 61, forming the bearing housing for the upper guide bearing 51, insulated from the main frame 3. As shown in Fig. 1, the upper part of the main frame is formed as a circular platform 62 with a central hole. An insulating bush 63 is interposed between this and the bossed plate 61. Thus the upper pivot 48 and bearing 51 are completely insulated from the frames 2 and 3, and can be used to form an electrical connection to connect the second leg of the D. C. supply to a conductor 64 on the vertical ring 2.

For this second electrical connection at the upper guide bearing a mercury pool is also employed. As shown in Fig. 1 there is fixed to the upper end of the pivot 48 a cup 65 having a central boss drilled to form an internal cup 66, in the bottom of which is placed a hardened steel ball 67: this part of the inner cup is of diameter only very slightly larger than the ball.

Protruding downwards into the inner cup 66 is a pin 68, which reaches nearly to the ball 67. This pin is shouldered, its upper part 68' being of larger diameter; it is fixed to a rigid dome-shaped cover 69 screwed to the bossed plate 61. The cup 65 and the inner cup 66 are partly filled with mercury: the interiors of these cups are in communication with each other by means of passages 70, so that the cup 65 simply acts as a splash-over return for the mercury in the inner cup 66. A cover plate 71 having only a very small clearance round the shouldered part 68' of pin 68 is provided for the cup 65: this is screwed to a flange on the cup 65. Owing to the special formation of the shouldered pin 68 and of the cups 65 and 66 mercury that is dashed vertically upwards, if the instrument is thrown violently about, is diverted and its energy dissipated, so that it is not shot out of the small clearances at the bearings.

Current is led into the vertical ring from the bossed bearing plate 61 via the cover 69, pin 68, the mercury pool in cup 66, to pin 48 and thence by lead 64 to a terminal 69 on the vertical ring near the horizontal pivot axis BB' of the rotor case 1.

The rotor, shown in Fig. 4, comprises a flywheel 72 and the armature 73 (including the commutator 73') of an electric motor mounted on a shaft 73" carried in bearings 74, 74' in the rotor case. The flywheel 72 is cup-shaped and the armature 73 is situated in the cup. There is sufficient room between the armature and the inside of the cup for the field poles 75 and field winding 76. These are mounted in the casting 77, in which is housed the bearing 74, and which forms half the rotor case. Bearing 74' is housed in casting 77' which forms the other half of the rotor case.

The motor is series wound, the circuit being from terminal 78 (Fig. 1) on the rotor case via lead 79 through one half of the field winding to brush-holder 80, through the armature 73 to brush-holder 81 and thence through the other half of the field winding to lead 82. To this lead there is joined a flexible lead consisting of a large number of very fine wires. This lead is secured to the side of the rotor case at a point opposite terminal 69 in the vertical ring to which it is connected by a freely hanging loop 83 which almost completely encircles the pivot axis. The insulation is removed from this part of the loop to make it more flexible and consequently, in order to remove any danger of a short circuit of this loop to the frame of the instrument, thin sheets of insulating material 84, 85 are provided on the inner face of the vertical ring 2 and on the side of the rotor case in the vicinity of the loop. An insulating bush 86 is also provided round the pivot shaft 87.

At the other end of the pivot axis a similar flexible loop connects terminal 78 with a corresponding terminal 88 screwed directly into the vertical ring. No insulation is required in the vicinity of this loop to insulate it from the rotor case and the vertical ring, since it is directly connected to both.

By the arrangements described for leading in current to drive the rotor, very low disturbing torques are provided at both the horizontal and vertical axes for the gyroscope, and, in fact, the greatest source of disturbance is found to be, not the electrical connections, but the ball bearings for both axes. These tend to become pitted with use, with the result that the pivots tend to rest in the pits, thereby introducing both frictional torques and torques acting to restore the rotor case to particular but variable positions. We have found that an important cause of such pitting is vibration of the rotor in its bearings in the rotor case, due, possibly, to slight residual unbalances that remain after the rotor has been balanced as well as possible, and also due to irregularities in the rotor bearings.

Accordingly, another important feature of our invention resides in the measures adopted to minimize damage to the bearings due to vibrations generated by the rotation of the rotor. For this purpose we resiliently mount the rotor case in the vertical ring.

The rotor case is pivotally mounted in the vertical ring by conical pivots. One of these 89 formed on the pivot shaft 87 is shown in Fig. 1: this forms the inner race of a ball bearing 90, the outer race 91 of which is housed in a conical plug 92, which is held, as is described below, into a corresponding socket 93 fixed in the vertical ring.

The plug 92 has a recess in the face that faces the rotor case; in it is located the outer race 91 of the ball bearing. In the outer face of the plug a hole is drilled which is provided with an internal thread to take the flanged nut 94. A layer of thin rubber 95 is inserted between the outer conical surface of the plug 92 and the socket 93, and the end of this is turned over the outer face of the socket 93 to lie between this and the flanges of the flanged nut 94. The nut is screwed up so as to draw the conical plug 92 moderately tightly into the conical hollow in socket 93, the flanged nut 94 exerting a corresponding thrust on the layer of rubber between the flanges of the nut and the socket 93. In this way the plug 92 can be located in the socket 93 with any desired amount of rigidity depending on the degree of pressure applied to the rubber layer 95. Sufficient pressure may be applied to locate the rotor case definitely in one mean position relative to the vertical ring so that it does not move therefrom during operation by an amount that causes any noticeable wandering of the gyro owing to the unbalance caused thereby, while sufficient resilience is nevertheless provided to leave the plug 92 free to execute with the rotor case the extremely minute high speed vibrations engendered by the rotation of the gyro rotor. As a result the balls of the ball bearing 90 are not subjected to the high speed hammering action that is the chief cause of pitting.

As a further consequence the high speed vibrations are filtered away from the vertical ring so that they are not applied to the bearings for the vertical axis.

When the flanged nut has been screwed up sufficiently to provide the optimum degree of compression to the rubber layer 95, a hole is drilled through it and through the socket 73, and a split pin is inserted to lock the nut to the socket so as to prevent relative rotation.

Socket 93 is screwed into a threaded hole in the vertical ring 2, nut 94 being slotted to admit a screwdriver for this purpose. In this way the bearings 90 at the two sides of the vertical ring 2 can be adjusted towards each other to take up play of the rotor case 1 along the axis BB' in its bearings 90. When the correct adjustment has been made, the sockets 93 are locked in the vertical ring 2. For this purpose the vertical sides of the ring are slotted by a cut in the central plane of the ring and clamping screws 97 are provided to draw the two parts of the ring together to grip the socket 93.

By the means just described we prevent movement of the centre of gravity of the rotor case and associated parts along the horizontal axis BB' during operation, with consequent disturbance of the balance of the gyroscope about the axis CC'. In order to prevent a shift of the centre of gravity along the axis AA' during operation, we provide means for preventing axial movement of the rotor relative to the rotor case. For this purpose the rotor 74' (Fig. 4) is provided with a spring thrust device for forcing the rotor in one direction.

The inner race 98 of bearing 74' is located on the rotor shaft 73'' against a shoulder while the outer race 99 is free to slide in an axial hole drilled in the casting 77', and is forced away from the nut 100, which is screwed into the threaded end of this hole, towards the bearing 74 by the spring 101, which abuts against the washer 102 in contact with the outer race 99. In this way the thrust of the spring is transmitted to the inner race 98 and serves to move the whole armature 73 to the left as shown in Fig. 4 until it is arrested by the outer race 104 of bearing 74 meeting the end plate 105, which is screwed to casting 77. The thrust of spring 101 is transmitted to the inner race 103 of bearing 74, from which it acts through bearing 74 to outer race 104 and end plate 105. Play in both the bearings 74 and 74' is therefore eliminated.

The bossed portion of casting 77' that forms the bearing housing for bearing 74' is also threaded externally and on it is screwed a nut 106. This nut is partly split by a cut 107, so that the part 106' is resiliently spaced from the main part; the nut can therefore be adjusted to any distance from the vertical axis CC' and is self-locking in every position.

On assembly, the nut 106 is screwed to a definite marked position and the gyroscope as a whole is then balanced about the axes AA', BB' and CC'. The nut 106 is then screwed in one direction or the other, in accordance with a scale of latitudes, to a position corresponding to the latitude of the place in which the instrument is being used. The weight then applies a constant torque about the horizontal axis BB', causing the gyroscope to precess round the vertical axis CC' at a rate equal to the vertical component of the earth's spin at the latitude in question.

In order to be able to set the gyro to any heading, a gear wheel 108 is fixed to the under side of the vertical ring. This is not normally in engagement with any other gear, but the crown gear 109 may be engaged with it by pushing inwards the knob 110. At the same time, locking mechanism is actuated to lock the rotor case 1 to the vertical ring 2, so that tilt about the axis BB' is prevented. Locking mechanism, or caging mechanism, is already known for this purpose, and is therefore not described here as the particular type employed is not an essential part of the present invention.

Owing to the fact that the rotor case 1 is caged it is possible forcibly to turn the vertical ring 2 together with the rotor case by the knob 110 when the crown gear 109 is engaged with the gear 108.

In order to read changes in course of the craft a card 111 engraved with compass markings is fixed to the upper part of the vertical ring and a window 112 is provided in the main frame 3 by which the card 111 can be read against a lubber line index 113. A corresponding window 114 is provided in the binnacle.

What we claim is:

1. In a directional gyroscope, a vertical ring mounted for rotation about a vertical axis, a rotor bearing casing having trunnions thereon for pivoting the same in said ring, and a multi-part ball bearing for pivotally supporting each trunnion in said vertical ring comprising a ball race, a retaining plug therefor having its outer surface tapered outwardly, a socket having a complementary tapered inner surface surrounding said plug, a rubber layer between said surfaces, and a flanged nut threaded in said plug and clamping said plug and socket together, with said rubber in between, the whole being threaded in said vertical ring.

2. A directional gyroscope as claimed in claim 1, in which said vertical ring has a threaded aperture receiving said socket, said ring being split adjacent thereto, and a clamp screw for locking said socket in the desired position.

WILLIAM GEORGE HARDING.
ROBERT HAYES NISBET.